United States Patent [19]
Antonov

[11] Patent Number: 6,042,500
[45] Date of Patent: Mar. 28, 2000

[54] WET MULTI-DISK COUPLING DEVICE, AND AN AUTOMATIC TRANSMISSION EQUIPPED THEREWITH

[75] Inventor: Roumen Antonov, Paris, France

[73] Assignee: Antonov Automotive Technologies B.V., Rotterdam, Netherlands

[21] Appl. No.: 09/135,452

[22] Filed: Aug. 17, 1998

Related U.S. Application Data

[63] Continuation-in-part of application No. 08/669,512, Oct. 4, 1996, Pat. No. 5,860,890.

[30] Foreign Application Priority Data

Jan. 23, 1995 [FR] France ................................ 95 00723
Aug. 18, 1997 [FR] France ................................ 97 10444

[51] Int. Cl.[7] .................................................. F16H 17/08
[52] U.S. Cl. ................. 475/257; 192/107 M; 192/70.14
[58] Field of Search ................ 475/257; 192/70.14, 192/107 M, 48.3, 48.92

[56] References Cited

U.S. PATENT DOCUMENTS

| | | | |
|---|---|---|---|
| 3,552,533 | 1/1971 | Nitz et al. | 192/107 M |
| 3,695,406 | 10/1972 | Graham et al. | 192/107 M |
| 3,759,353 | 9/1973 | Marin . | |
| 3,895,693 | 7/1975 | Lucien et al. | 192/70.14 X |
| 4,042,085 | 8/1977 | Bjerk et al. | 192/70.14 X |
| 4,286,694 | 9/1981 | Wiseman, Jr. et al. | 192/70.14 X |
| 4,700,823 | 10/1987 | Winckler | 192/107 M |
| 4,828,089 | 5/1989 | Collins et al. . | |
| 4,846,326 | 7/1989 | Tilton et al. | 192/107 M |
| 5,004,089 | 4/1991 | Hara et al. | 192/107 M |
| 5,007,508 | 4/1991 | Lacombe | 192/107 M X |
| 5,263,906 | 11/1993 | Antonov | 475/257 |
| 5,484,347 | 1/1996 | Holmquist | 475/231 |
| 5,514,044 | 5/1996 | Antonov | 475/257 |

FOREIGN PATENT DOCUMENTS

| | | |
|---|---|---|
| 27 22 575 | 12/1977 | Germany . |
| 35 40 290 | 5/1986 | Germany . |
| WO 96/23144 | 4/1996 | WIPO . |

*Primary Examiner*—Dirk Wright
*Attorney, Agent, or Firm*—Kenyon & Kenyon

[57] ABSTRACT

The coupling device, such as a clutch, comprises an alternation of first discs (22) made from hardened steel and having teeth (25) for rotational coupling with a first member of the clutch, and second disc (19) having teeth (15) for rotational coupling with a second member of the clutch. The second discs (19) are made of carbon fibers embedded in a carbon base material, with no support inside the disc. The stable and progressive operation of the clutch and the life time of the discs are improved. Costs and space-requirement are reduced over all-carbon devices.

41 Claims, 4 Drawing Sheets

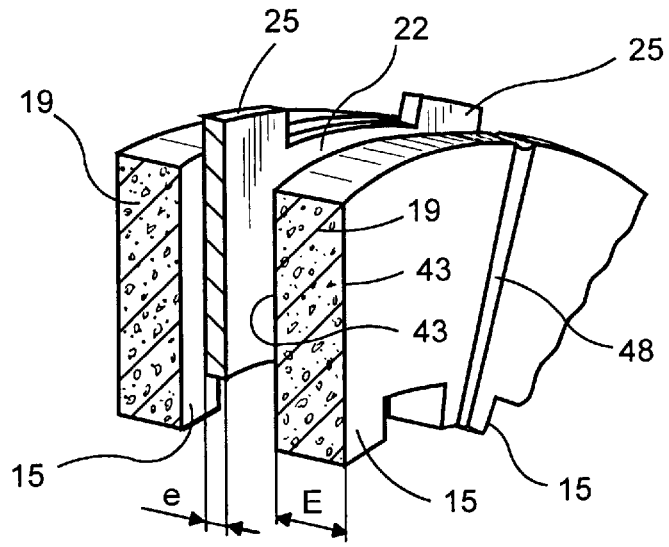
F I G. 5
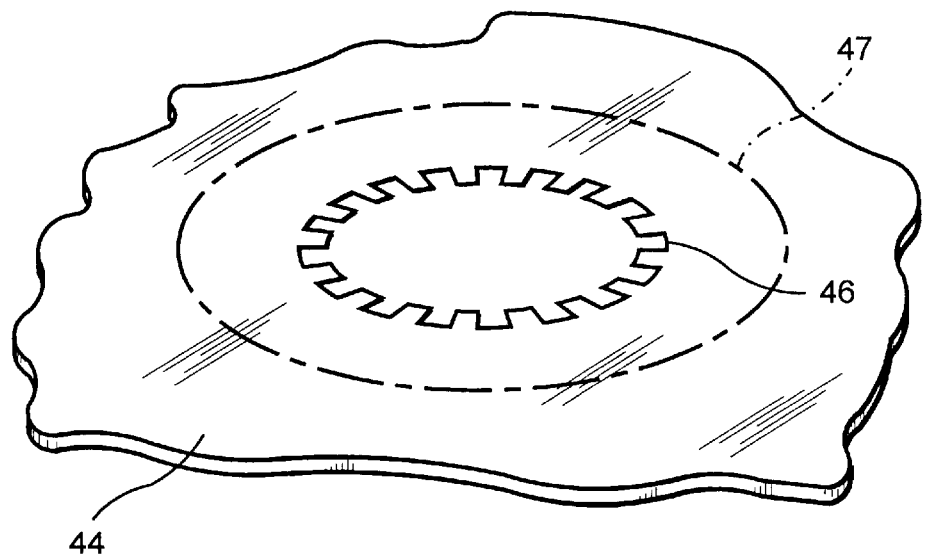
F I G. 6

WET MULTI-DISK COUPLING DEVICE, AND AN AUTOMATIC TRANSMISSION EQUIPPED THEREWITH

DESCRIPTION

This is a continuation-in-part of my application No. 08/669,512 filed Oct. 4, 1996, now U.S. Pat. No. 5,860,890.

The present invention relates to a multi-disc friction coupling deice, in particular a clutch or a brake, of the type which can be used for example in automatic transmissions for motor vehicles for the selective coupling of two rotary members of the transmission and thus to control the transmission ratio between the input and the output of the transmission.

The present invention also relates to an automatic transmission equipped therewith.

Automatic transmissions current use, for controlling the transmission ratio which they provide, multi-disc clutches comprising an alternation of plates- or discs- connected to one and respectively to the other of two rotary members which must be selectively coupled and uncoupled. The coefficient of friction of the material used for the discs and the number of discs and their diameter have an effect on the axial engagement force which it will be necessary to apply to the clutch in order that the latter is capable of transmitting to one of the rotary members the torque received from the other. These clutches work in an oil bath whose function is cooling, the reduction of wear and the elimination of any residual friction even if the clearance between the discs is very small when the clutch is in the disengaged state. Normally, the discs are made of hardened steel and their thickness is chosen to be as low as is reasonably possible. In fact it is sought to reduce the axial dimension of the multi-disc clutch.

In practice, these clutches do not always have the qualities expected of them. In particular, the change from the coupled state to the uncoupled state is sometimes sudden. Furthermore, the clutch is subject to wear phenomena and consequently to a deterioration of its functional qualities over the course of time.

These defects assume a particular importance in the case of certain types of automatic transmission, such as described in WO-A-92 07 206, in which the friction characteristics between the discs are one of the elements which determine the shifting points from one ratio to another in the transmission. The term "shifting point" refers to each pair of values, speed of rotation/torque to be transmitted, for which the transmission automatically shifts from one ratio to another. There are an infinite number of possible shifting points because each value of torque to be transmitted corresponds to a speed of rotation at which the automatic transmission will shift.

In the transmissions according to WO-A-92 07 206, shifting down from a given transmission ratio to a lower transmission ratio is carried out when the clutch, submitted to a calibrated engagement force, is no longer capable of transmitting the torque and therefore begins to slip. If the coefficient of friction is uncertain the shifting point for such a change of ratio will itself be uncertain.

Shifting up from a ratio to a higher ratio results from a different process according to which the calibrated engagement force progressively overcomes a contrary force generated by a gearing reaction. At the same time, the passage of an increasing proportion of the power through the clutch progressively causes this gearing reaction to disappear. This finally makes it possible for the engagement force to acquire total supremacy. This process necessitates high quality in the frictional relationship between the discs if it is desired to avoid jolts.

Such ratio change processes give rise, between the discs, to phases of friction under load which are longer than in the case of entirely conventional automatic transmissions where the clutches and the brakes are actuated by actuators which are themselves controlled by logic control circuits.

It has been shown according to the invention that the coefficient of friction between steel discs varied with temperature and that these variations were the source of most of the observed operational defects. For example, during a progressive engagement process of the clutch, the temperature of the discs rises as the friction increases. The coefficient of friction increases as a consequence. This tends to cause a too-fast locking of the clutch, whether it is controlled by an actuator or in accordance with WO-A-92 07 206.

In a transmission according to WO-A-92 07 206, the shifting point to a lower ratio depends directly on the coefficient of friction between the discs. Consequently, the shifting point is not the same when the transmission operates at a relatively low temperature or, on the contrary, at a relatively high temperature, or especially just after the heating up having resulted from a recent change of ratio in the opposite direction.

A friction coupling device using discs with metal supports is known from U.S. Pat. No. 4,828,089. At least one disc out of two carries heavily grooved carbon linings in order to allow an intense circulation of a cooling and lubricating liquid. In fact, the bond between the carbon and the metal support does not withstand high temperatures. Such a device is expensive to produce, complex to put into use and has poor performance.

U.S. Pat. No. 4,700,823 discloses a similar oil-lubricated friction coupling device in which steel discs are interleaved with discs having a steel core with carbon lining bonded on either side thereof.

U.S. Pat. No. 4,286,694 discloses a friction device in which all the discs are made of a single mass of carbon based material. This is expensive and axially cumbersome. A carbon disc is normally much thicker than a steel disc.

U.S. Pat. No. 3,552,533 discloses numerous types of a dry clutch having the same drawbacks. It is recommended therein that the mutually engaged friction surfaces be all of carbon. An example of multi-disc clutch with all discs made of a mass of carbon material is given.

An object of the present invention is to overcome the said disadvantages by proposing a multi-disc friction device which is less expensive, compact and/or stable in operation, and/or to propose an automatic transmission having improved operation an/or cost-effectiveness due to incorporating a friction coupling device which is improved in at least one of the above-cited respects.

According to the invention, there is provided a multi-disc friction coupling device, in particular for an automatic transmission intended for motor vehicles, comprising first and second coaxially rotatable members, a first group of discs made of metal which are mounted for common rotation with the first member and alternating with discs of a second group which are mounted for common rotation with the second member, and means for selectively axially compressing and respectively axially releasing the discs, wherein each disc of the second group comprises a single mass of a carbon-based material defining two opposed friction faces, said opposed friction faces being exposed to contact with oil of an oil bath at least when the coupling device is disengaged.

It has been observed that the metal/carbon contact gave rise to a coefficient of friction which was substantially indifferent to the temperature of the discs. Furthermore, the friction under load of metal against carbon generates only insignificant wear, even if the temperature locally reaches very high values at certain stages of the operation. Although the invention is directed to an oil-bath friction device, the above qualities are kept even if the lubrication is limited, if especially the discs are smooth, i.e. ungrooved. This allows to reduce the thickness of the discs and their manufacturing cost.

According to the invention, there is furthermore provided an automatic transmission comprising at least one combination of teeth and at least one multi-disc friction coupling device which is automatically controlled between an engaged state and a disengaged state in order to cause the combination of teeth to operate in a first and respectively in a second transmission ratio, wherein said multi-disc coupling device comprises first and second coaxially rotatable members, a first group of discs made of metal, which are mounted for common rotation with the first member and alternating with discs of a second group, which are mounted for common rotation with the second member, and means for selectively axially compressing and respectively axially releasing the discs, wherein each disc of the second group comprises a single mass of a carbon-based material defining two opposed friction faces, said opposed friction faces being exposed to contact with oil of an oil bath at least when the coupling device is disengaged.

Preferably, the friction coupling device is a clutch, the combination of teeth is at least partially off-loaded when the clutch is engaged, and the transmission comprises means of transmitting to the clutch, in the sense of disengagement, a gearing reaction generated in the combination of teeth when it is under load, means for engaging the clutch under a calibrated force giving the clutch a corresponding torque transmission capability, and a means of the free wheel type to prevent the reverse rotation of a reaction member supporting one set of the teeth of the combination.

Preferably, the carbon of the discs of the second group is reinforced with fibres, in particular with carbon fibres, according to the technology known as "carbon-carbon".

According to a preferred method of manufacturing a carbon friction disk of the second group, the following steps are carried out:
—the production of a blank having approximately the shape of the disk to be produced and incorporating carbon powder and support fibres extending in at least two mutually transverse directions which are substantially parallel with the plane of the blank;
—carbonization of the blank; and
—machining at least certain of the faces of the carbonized blank, for finishing purposes.

During he carbonization, in a way known per se, the support fibres, which can for example be made of cotton or of a synthetic material of the textile type, disappear and are replaced by carbon fibres. Due to the orientation of the support fibres in at least two mutually transverse directions which are parallel with the plane of the blank, there is, in the disk obtained and at all points, either radial fibres or fibres forming at least two different acute angles with respect to the radial direction. In both cases, the fibres thus oriented give the disk a very high resistance with respect to shearing between successive tangential planes. In other words, the disk produces has a very high capability of transmitting torque from the body of the disk to one of its peripheries, inner or outer. In particular, if one of the peripheries, inner or outer, of the disk comprises coupling teeth, these teeth are very resistant to shear in the circumferential or tangential direction.

The blank can be produced from stacked sheets of fibres, which sheets can be woven or non-woven. A woven sheet itself provides two mutually transverse orientations of fibres. The woven sheets can be stacked with all of them having the same orientation with respect to one another with regard to the orientation of the fibres in the fabric, or the fabric sheets can be oriented differently with respect to one another in order to have, for example, a total of four orientations of fibres in the blank and then four orientations of carbon fibres in the disk obtained.

If the sheets are non-woven, they can have, in certain cases, a privileged orientation of the fibres. The desired two mutually transverse directions of the fibres in the blank are therefore obtained by angularly offsetting the successive sheets in such a way that the privilege orientation is angularly offset from one sheet to another in the stack.

Tests have shown that it was not essential to provide carbon fibres in a third direction, transverse with respect to the plane of the disk. But this can however be provided if it is feared that the various constituent layers of the disk produced by the stacking of sheets would become separated from one another due to the transmission of load between the friction faces and the layers located at deeper levels. It is therefore possible, for example, to provide transverse linking fibres between the sheets within the blank. The blank could, for example, be obtained by a process of needling said sheets stacked upon one another.

It is however thought that the reason why detachments between the constituent strata of the disk are not observed in practice during the tests is as follows: the disk is highly compressed axially when it has to transmit forces. This high compression reinforces the adhesion between the strata.

It is advantageous for the sheets to be from 3 to 5 in number per millimeter of thickness of the blank, that is to say about 10 to 20 strata in a disk having a preferred thicknesses of 3 to 4 millimeters.

Preferably, the disk has a porosity of between 10 and 30% and, more preferably, of between 15 and 25%.

This porosity is very advantageous for friction coupling devices according to the invention, operating in an oil bath, such as those used in particular in automatic transmissions for motor vehicles. The porosity allows the oil to flow inside the disk. In particular the oil which becomes trapped between the disks at the time the coupling device is engaged can lubricate the contact between the disks during the slipping phase and can evacuate the heat produced. Then, as the disks continue to approach each other, the oil is evacuated through the pores of the carbon disk, such that the contact between the disks then becomes substantially dry with an improved coefficient of friction.

The ranges of porosity value which have been given are motivated by the following considerations:
—below 10 to 15% porosity, the effect of oil flow inside the disk is generally insufficient; and
—above 25 to 30%, the mechanical stability of the disk can be problematic.

Those skilled in the specialist art of producing carbon-carbon material know how to obtain a predetermined porosity to within a reasonable tolerance as a function, in particular, of the initial fibrous structure and the proportion of carbon powder which is placed in the blank before carbonization.

It has also proved advantageous for the carbon fibres to have a diameter of between about 5 to 10 $\mu$m, and preferably of about 7 to 8 $\mu$m.

Other features and advantages of the invention will emerge from the following description, given with reference to non-limitative examples.

In the accompanying figures:

FIG. 5 is a partial view in cross-section and in perspective of three discs of the clutch of the transmission shown in FIGS. 1 to 4;

FIG. 6 is a diagrammatic view in perspective showing the method of manufacture of a carbon disc;

Figures 1, 2:
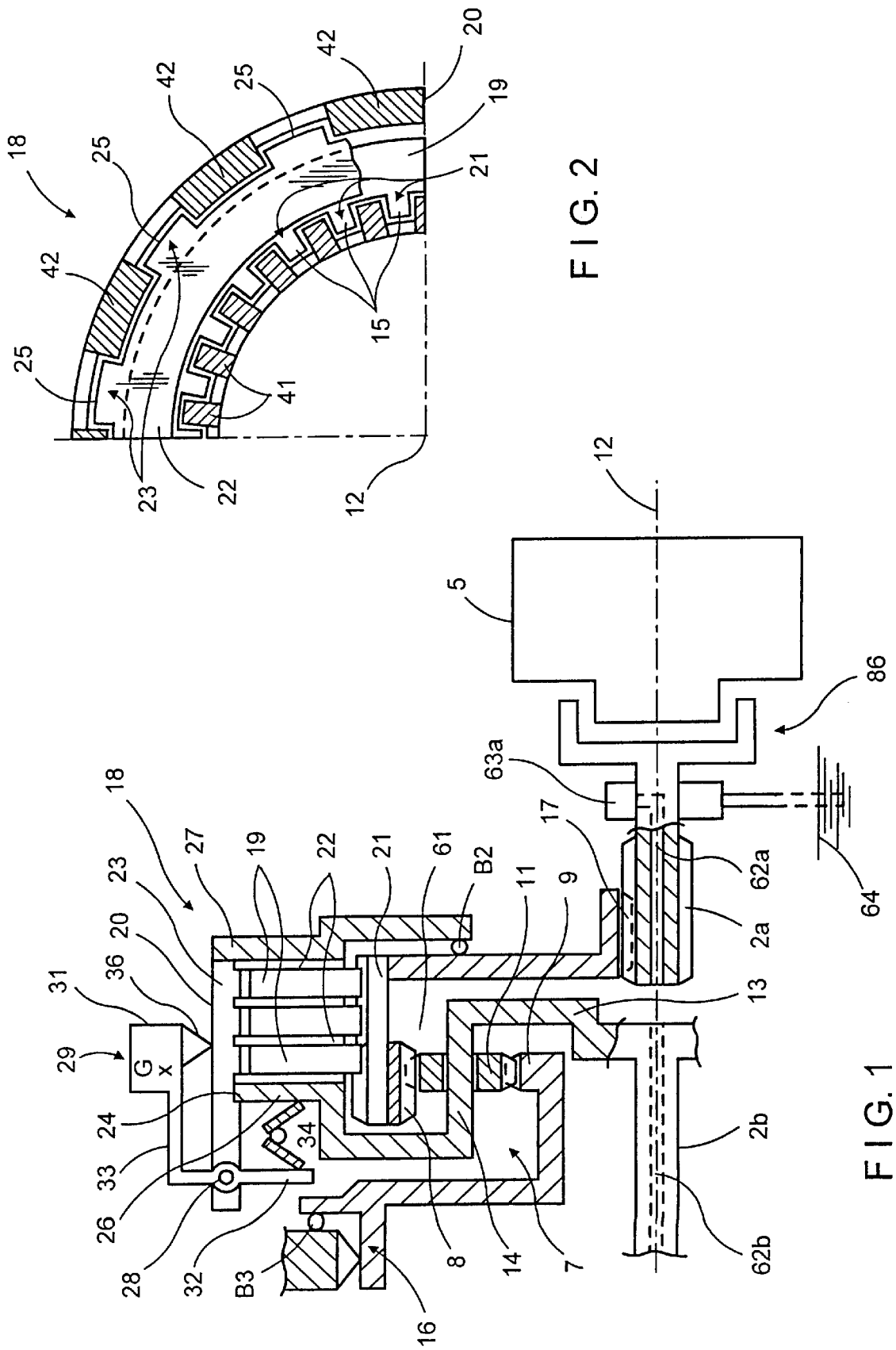
FIG. 1 is a partial, diagrammatic half-view in longitudinal cross-section of a transmission having at least two ratios according to the invention, in the rest state, equipped with a multi-disc clutch according to the invention.
FIG. 2 is a partial view of the multi-disc clutch of the transmission shown in FIG. 1, in cross-section.

The transmission shown in FIG. 1, intended in particular for a motor vehicle, comprises a transmission device having two ratios and having an input shaft 2a and an output shaft 2b aligned with the axis 12 of the transmission. The input shaft 2a is connected to the output shaft of an engine 5 of a motor vehicle with the interposition of an input clutch 86. The output shaft 2c is intended to drive, directly or indirectly, the input of a differential in order to drive the drive wheels of a vehicle. Between the output shaft 2b and the input of the differential there can, for example, be interposed another transmission device with two or more ratios and/or a manually controlled forward drive/reverse drive change-over mechanism.

The input 2a and output 2b shafts are immobilized with respect to the casing 4 (partially shown) of the transmission.

The transmission device comprises a differential gearing formed by an epicyclic train 7. The train 7 comprises a crown 8 with internal teeth and a sun wheel 9 with external teeth, both engaging with planets 11 supported, at regular intervals, around the axis 12 of the transmission device, by a planet carrier 13 connected rigidly to the output shaft 2b. The planets 11 can rotate freely about eccentric journals 14 of the planet carrier 13. The sun wheel 9 can rotate freely about the axis 12 of the transmission device with respect to the output shaft 2b which it surrounds. However, a freewheel device 16 prevents the sun wheel 9 from rotating in the reverse direction, that is to say in the direction opposite to the normal direction of rotation of the input shaft 2a with respect to the casing 4 of the transmission.

The crown 8 is connected in rotation, but free in axial sliding, with respect to the input shaft 2a, by the intermediary of splines 17.

A multi-disc clutch 18 is disposed around the crown 8. It comprises a stack of annular discs 19 alternating with annular discs 22. The discs 19 are connected in rotation to the crown 8 with the possibility of axial sliding. To achieve this, the discs 19 have internal teeth 15 (FIG. 2) engaged in grooves 21 which are integral with the crown 8. The discs 22 are connected in rotation, with the possibility of axial sliding, to the planet carrier 13. To achieve this, a cage 20 comprises, on its radially internal face, grooves 23 into which are slidingly engaged external teeth 25 of the discs 22 and external teeth 24 of the planet carrier 13 (FIG. 1).

The grooves 21, 23 consist of open slots between ribs 41, 42. The open slots allow oil to move radially outwardly by centrifugal effect so as to enter through grooves 21 into the annular space occupied by the discs 19, 22, travel between the discs at least when the clutch is disengaged, and exit the annular space through the grooves 23. If required, specific means can be provided to feed oil to the space 61 located radially inside the grooves 21. Such specific means can comprise an axial duct 62a and/or 62b in at least one of shafts 2a or 2b. Such duct 62a or 62b opens into said space 61 where oil is discharged and centrifugated. The duct 62a is fed by an oil pump 63a sucking oil from a sump 64 at the bottom of the transmission casing. A similar pump (not shown) would be provided on shaft 2b to feed the duct 62b.

The stack of discs 19 and 22 can be axially clamped between a retaining plate 26 which is integral with the planet carrier 13 and a mobile plate 27 which is part of the cage 20.

The cage 20 supports centrifugal fly-weights 29 disposed in a ring around the clutch 18.

The fly-weights are therefore connected for common rotation with the output shaft 2b of the transmission device.

Each fly-weight has a solid body 31 located radially outside the discs 19 and 22 and an actuating tip 32 pressed against an external face of the fixed plate 26 by the intermediary of a Belleville spring 34. The tip 32 is connected to the solid body 31 by an elbow bent arm 33 articulated to the cage 20 about an axis 28 oriented tangentially with respect to the axis 12 of the device. WO-A-91/13275 describes advantageous arrangements for the articulated mounting of such fly-weights. The centre of gravity G of the fly-weight is located inside or in the vicinity of the solid body 31, and at a certain distance from the axis 28, said distance being measured parallel to the axis 12 of the device.

Figure 4:
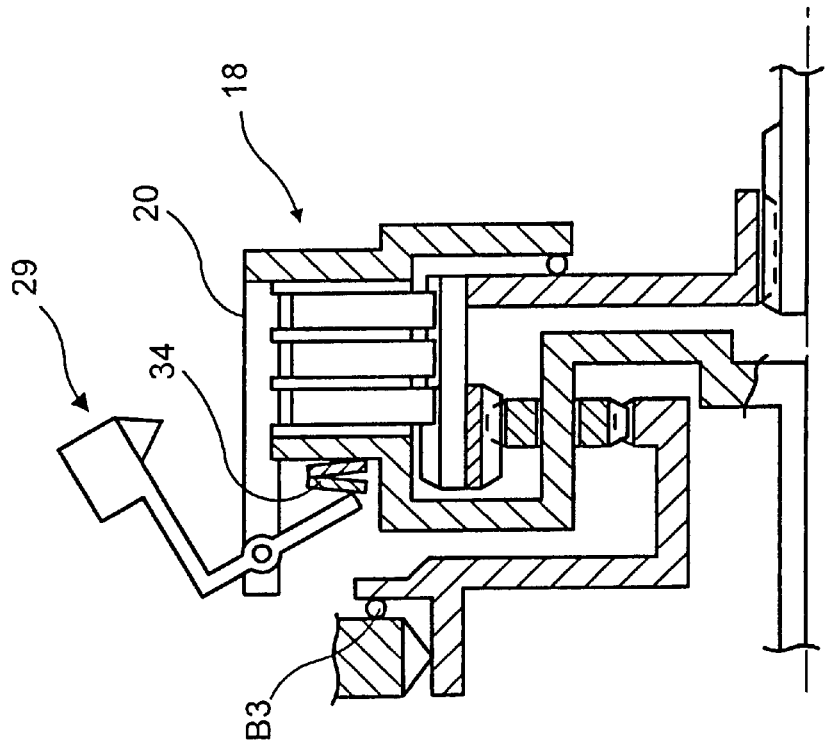
FIGS. 3 and 4 are views similar to that of FIG. 1, but simplified and relating to operation as a reduction gear and in direct drive respectively.

Thus, the rotation of the planet carrier 13 tends to cause the bodies 31 of the fly-weights 29 to pivot radially outwardly about their tangential axes 28 under the effect of their centrifugal force Fa, in order to make them move from a position of rest defined by a stop 32 against the cage 20 (FIGS. 1 and 3) to a separated position which can be seen in FIG. 4.

This then results in a relative axial displacement between the tip 32 and the articulation axis 28 of the fly-weight, and therefore between the tip 32 and the cage 20. With respect to the direction of displacement corresponding to the centrifugal separation of the fly-weights 29, the cage 20 is pressed axially against the crown 8, with relative rotational freedom, by an axial thrust bearing B2.

Thus, the displacement of the cage 20 with respect to the tip 32 causes a movement of relative coming together between the tip 32 and the mobile plate 27 of the clutch 18. This relatively displacement can correspond to a compression of the Belleville spring 34 and/or to a displacement of the mobile plate 27 towards the fixed plate 26 in the direction of engaging the clutch 18.

When the transmission device is in the rest state as shown in FIG. 1, the Belleville spring 34 rests by one side against the fly-weights 29 which are abuted in the rest state, and apply to the cage 20, by the other side, a force which engages the clutch 18 such that the input 2a of the transmission device is coupled in rotation with the output 2b and the transmission device constitutes a direct drive capable of transmitting a torque up to a certain maximum defined by the compression of the Belleville spring.

Furthermore, the teeth of the crown 8, the planets 11 and the sun wheel 9 are of the helical type. Thus, in each pair of teeth engaging under load, opposing axial thrusts appear which are proportional to the circumferential force transmitted, and therefore to the torque on the input shaft 2a and to the torque on the output shaft 2b. The direction of helical inclination of the teeth is chosen such that the axial thrust Pac (FIG. 3) arising in the crown 8 when it is transmitting a driving torque is applied in the direction in which the crown 8 pushes the mobile plate 27, by the intermediary of the thrust bearing B2. Thus, when the axial thrust Pac exists, the crown 8 pushes the plate 27 in the direction separating it from the retaining plate 26 of the clutch 18. The planets 11, which mesh not only with the crown 8 but also with the sun wheel 9, are subjected to two opposing axial reactions PS1 and PS2, which balance out, and the sun wheel 9 is subjected to, taking account of its meshing with the planets 11, an axial thrust Pap which is equal in intensity and opposite to the axial thrust Pac of the crown 8. The thrust Pap of the sun wheel 9 is transmitted to the casing 4 by the intermediary of a thrust bearing B3. Thus, the axial thrust Pac is applied to the mobile plate 27 of the clutch and with respect to the casing 4, and therefore with respect to the retaining plate 26 of the clutch, and this occurs in the direction tending to disengage the clutch 18. This force, transmitted by the thrust bearing B2 to the cage 20, also tends to bring towards one another the tip 32 of the fly-weights 29 and the retaining plate 26, and therefore to keep the fly-weights 29 in their position of rest and to compress the Belleville spring 34.

Figure 3:
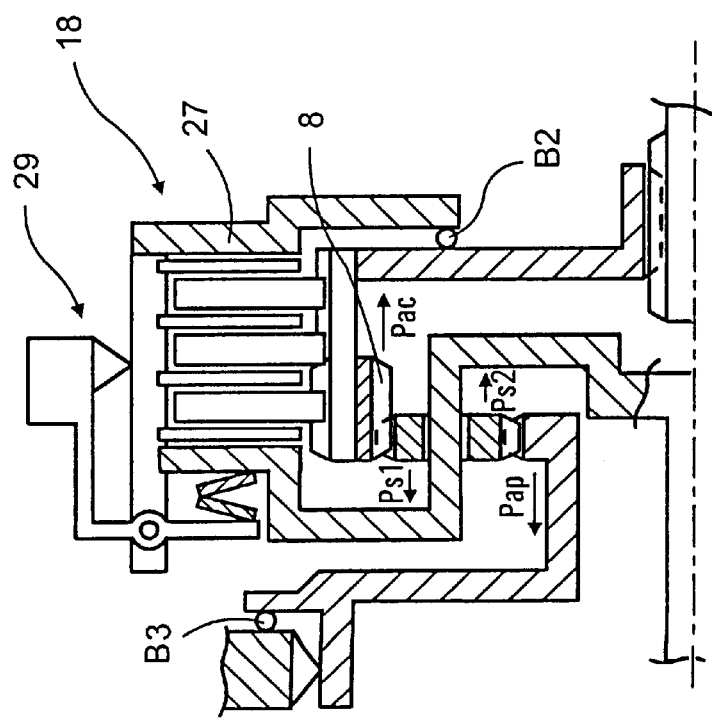

This is the situation shown in FIG. 3. Assuming that this situation is reached, the basic operation of the device will now be described. As long as the torque transmitted to the transmission device by the input shaft 2a is such that the axial thrust Pac in the crown 8 suffices to compress the Belleville spring 34 and to hold the fly-weights 29 in the rest position shown in FIG. 3, the separation between the retaining plate 26 and the mobile plate 27 of the clutch is such that the discs 19 and 22 slip against one another without transmitting torque between them. In this case, the planet carrier 13 can rotate at a speed different from that of the input shaft 2a, and it tends to be immobilized by the load which the output shaft 2b must drive. The result of this is that the planets 11 tend to behave as motion reversers, that is to say to cause the sun wheel 9 to rotate in the direction opposite to the direction of rotation of the crown 8. But this is prevented by the free wheel 16. The sun wheel 9 is therefore immobilized by the free wheel 16 and the planet carrier 13 rotates at a speed which is intermediate between the zero speed of the sun wheel 9 and the speed of the crown 8 and of the input shaft 2a. The unit therefore operates as a reduction gear. If the speed of rotation increases and the torque remains unchanged, a time arrives when the centrifugal force of the fly-weights 29 produces between the retaining plate 26 and the mobile plate 27 an engaging force with is greater than the axis thrust Pac, and the mobile plate 27 is pushed towards the plate 26 to achieve direct drive.

When the clutch 18 is engaged, all of the power is transmitted directly from the crown 8, connected to the input shaft 2a, to the planet carrier 13, connected to the output shaft 2b. Consequently, the teeth of the epicyclic train 7 no longer work, i.e. they no longer transmit any force and they do not give rise to any axial thrust. Thus, the axial thrust due to the centrifugal force can be applied fully to urge the plate 26 and 27 towards one another. The procedure for changing to direct drive is thus better understood: as soon as the discs 19 and 22 begin to rub against one another and transmit a proportion of the power, the teeth are proportionally off-loaded, the axial thrust Pac proportionally decreases and the supremacy of the centrifugal force increases more and more until the sun wheel 9 begins to rotate and the clutch 18 performs all the torque transmission and finally provides direct drive. This process is generally progressive, which is desirable for comfort, but gives rise to prolonged friction between the discs.

It can occur that the speed of rotation of the output shaft 2b reduces, and/or the torque to be transmitted increases, to the point at which the fly-weights 29 no longer provide, in the clutch 18, a sufficient engagement force to transmit the torque. In this case, the clutch 18 begins to slip. The speed of the sun wheel 9 decreases until it stops. The free wheel 16 immobilizes the sun wheel and the gearing force Pac reappears in order to disengage the clutch, such that the transmission device then functions as a reduction gear. Thus, each time that a change between operation as a reduction gear and operation in direct drive occurs, the axial force Pac varies in the sense which stabilizes the newly established transmission ratio. This is very advantageous on the one hand in order to avoid the incessant changes of ratio in the vicinity of certain critical operating points, and on the other hand in order that situations in which the clutch 18 is slipping are only transient.

The function of the Belleville spring 34 is to form a safety brake by coupling the engine 5 to the vehicle wheels when both are at rest, and to advantageously modify the characteristic of the engaging force applied to the clutch as a function of the speed of the output shaft 2b, in comparison with an engaging force which would be produced purely by the centrifugal effect.

It should be noted from the foregoing description that each up-shifting process comprises a first phase during which the discs slip against each other under an increasing resultant clamping force and a second phase in which they transmit by friction the whole torque while still slipping against each other.

During down-shifting, the same two phases occur, however in the reverse order and with the now second one occurring under a decreasing resultant clamping force. Such a clutch may therefore be subjected to relatively hard service conditions and its frictional behaviour, in particular progressivity, is of importance for avoiding shocks, and more generally uncomfortable and mechanically damageable shifting processes.

Certain features of the multi-disc clutch 18 according to the present invention will now be described. FIGS. 1, 3 and 4 show the multi-disc clutch as comprising only seven discs in total, but in practice this number may be considerably higher and can for example be up to about fifteen or twenty discs.

The discs 22, which will hereafter be referred to as "first discs" are made of hardened steel, according to the conventional technology of oil-bath multi-disc clutches. Their thickness "e" (FIG. 5) is for example about 1 mm.

On the other hand, the discs 19 integral in rotation with the crown 8 are entirely made from a material constituted of a carbon base material in which carbon fibres are embedded, according to the technology known as "carbon-carbon". In particular, these discs have no metallic or other reinforcing core. The previously mentioned carbonaceous material occupies all of the space between the opposite friction faces 43 of a disc (FIG. 5). The thickness "E" of the carbon discs 19 is greater than that "e" of the steel discs 22, and amounts for example to 3 mm.

As shown in FIG. 6, it is possible to produce such a disc from a sheet 44 of the said carbon-carbon material, having a uniform thickness equal to that desired for the discs 19, that is to say 3 mm in the example mentioned above, and the disc in cut, out along two coaxial contours 46 and 47, one of which corresponds to the radially internal contour and the other of which corresponds to the radially external contour of the disc 19 to, be produced. The internal contour 46 directly defines the teeth 15 of the disc, which are thus produced in one piece with the body of the disc defining the two friction faces 43.

In the example shown, there is a first disc 22 at each end of the stack of discs belonging to the multi-disc clutch 18, and the number of first discs 22 is therefore greater by one than the number of second discs 19. By choosing to make the discs whose quantity is lower out of carbon, the cost and axial dimension of the clutch are reduced.

In a conventional manner, the teeth 15 of the discs 19 whose teeth are radially internal are more numerous and have a distinctly closer pitch than the teeth 25 of discs whose teeth are external. In fact, for transmission of a same torque, the peripheral force is greater along the radially inner edge, and this necessitates the provision of more teeth along a periphery which is nevertheless smaller than the external periphery. It is preferred, according to the invention, that the carbon discs should be those whose teeth are internal, as shown. As these discs are thicker, the area of contact between each tooth and the corresponding groove side is relatively large and the number of teeth can therefore be reduced. Furthermore, discs with internal teeth have smaller internal and external diameters. They therefore require less material and their manufacture using the method illustrated in FIG. 6 causes less waste of material inside the contour 46 and outside the contour 47.

As shown in FIG. 5, it is possible to form in each friction face 43 of each carbon disc 19 at least one radial groove 48 and preferably at least two diametrically opposed radial grooves. Each groove extends from the free edge of a tooth 15 of the disc to the peripheral edge of the disc opposite to the teeth 15. In service, these grooves form, with the adjacent face of the neighbouring steel disc 22, a duct in which oil flows radially towards the outside by centrifugal effect.

The edges of the grooves 48 are incapable of damaging the steel discs. If the grooves were made in the steel discs, this could result in these discs having to be provided thicker, and in the risk of the edges damaging the adjacent carbon disc. The purpose of the grooves 48 is to allow oil to flow from the region 61 (FIG. 1) located radially inside the discs to the region located radially outside the discs even when the clutch is engaged. But these grooves are not essential. It is currently preferred that the friction surfaces of the discs should be entirely smooth and that a passage is provided elsewhere to allow oil to flow as has just been described even when the clutch is engaged. Even if grooves such as 48 are provided, the discs can be considered as substantially smooth if these grooves remain rather small in number and leave large smooth areas. It has in fact appeared that in such conditions the grooves 48 do not significantly lubricate the contact between the discs when the clutch is in the state of end of slipping or in the state of adhesion under the effect of an engaging force.

The carbon disks have a porosity of between about 10% and about 30%, preferably between about 15% and about 25%. The pores constituting this porosity communicate with each other and the network of pores emerges through the friction faces 43 as well as through the radially outer periphery 47 of the disk.

Thus, when the clutch changes from the released state to the engaged state, the oil trapped in the interfaces is evacuated progressively through the friction faces 43 and then in a centrifugal manner in the network of pores towards the outside of the disk. This assists a flow of oil from the inner periphery 46 towards the outer periphery 47 in order to contribute to the cooling of the disk, in particular during the phases of slipping under load. Therefore, the network of pores preferably also opens through the inner periphery 46.

The diameter of the carbon fibres of the disk is between about 5 and 10 $\mu$m, preferably between about 7 and 8 $\mu$m. These diameters have proved appropriate for giving the disk the desired mechanical strength and for forming a favourable porous network between them.

Figure 7:
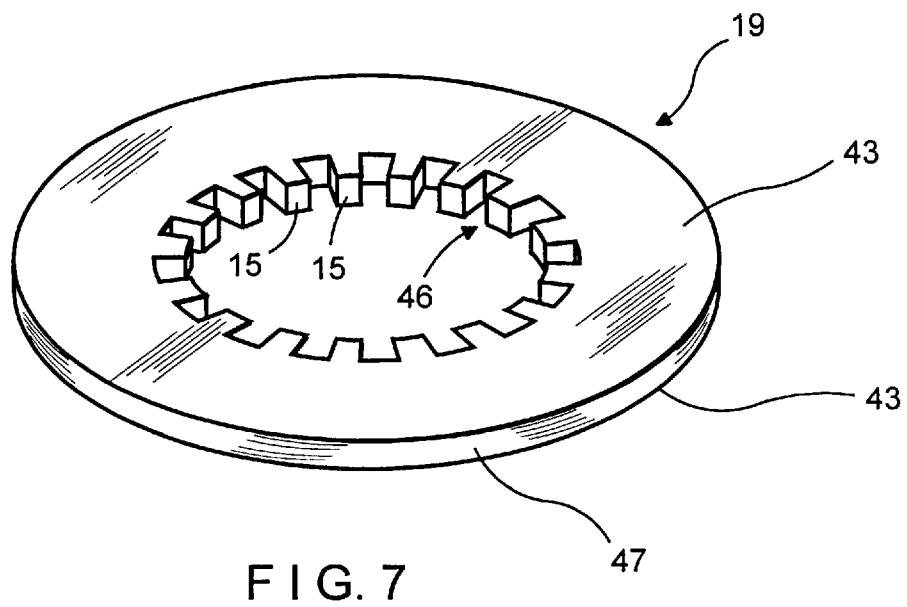
FIG. 7 is a perspective view illustrating another embodiment for a carbon disc useful in the embodiment of FIGS. 1–4 or the blank of such a disc before carbonization.

In the embodiment of FIG. 7, as illustrated by cross-hatching on the visible friction face 43, the carbon fibres are disposed in two mutually transverse directions, preferably perpendicular to each other, and parallel with the friction surfaces. The fibres form multiple crossing with eachother, said crossings underlying each friction face. In the direction of the thickness, the disk consists of strata rendered integral with each other by the carbonization process and, if necessary, by fibres (not shown) oriented transversely with respect to the friction faces 43.

The friction faces 43 of the discs according to the embodiment of FIG. 7 are completely smooth, i.e. have no groove, and the friction faces of the metal discs of the first group are also deprived of any groove.

Figure 8:
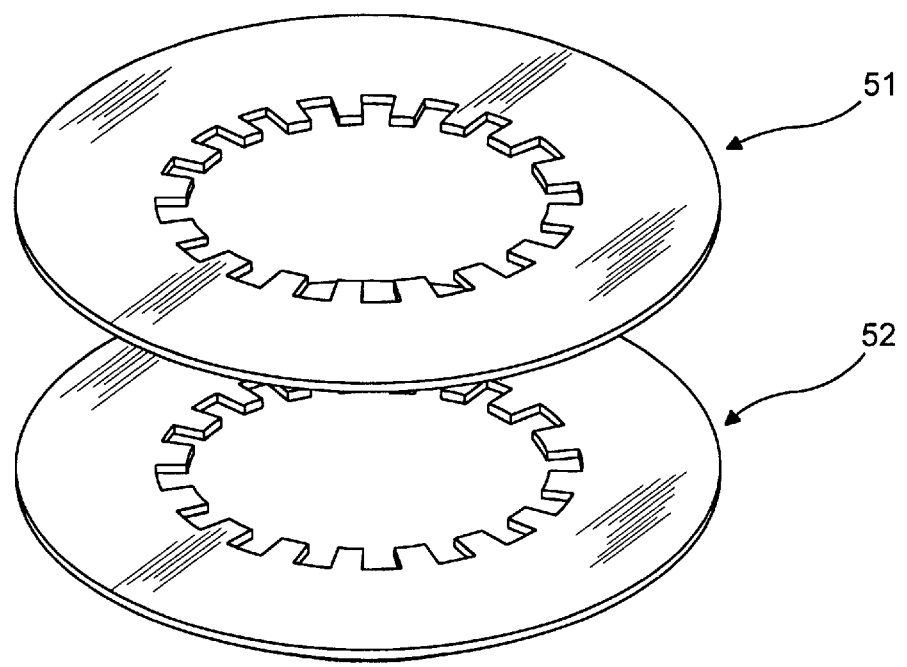
FIG. 8 is a diagrammatic view in perspective showing the method of manufacture of the carbon disc of FIG. 7.

FIG. 8 shows two of the sheets 51 and 52 that are stacked in order to constitute the blank.

It can be seen by the cross-hatching that each of these sheets, for example made of cotton fabric, comprises at least two mutually transverse directions of fibres. Once the sheets have been stacked, made to adhere to one another and impregnated with carbon powder, the blank obtains an appearance close to that shown in FIG. 7 for a completed disk. In particular, the teeth of the inner contour are already present. The sheets can be cut out individually from a piece of fabric using an appropriate punch mounted on a press, as suggested in FIG. 8, or it is possible, in the same manner, to cut out a stack of pieces of fabric which can be already stuck together, in order to obtain the stack of sheets directly, as illustrated in FIG. 6 where the dotted and dashed lines 146, 147 indicate the cutting out profiles.

Once the blank is completed, it is carbonized at an appropriate temperature, using a known technique. Then, a finishing machining process is carried out. For example, the friction faces 43 and the faces of the teeth of the inner contour 46 of the disk are precision ground. These machining operations are small, as is the wastage of carbonaceous material, because the sheets are given, before carbonization, contours such that the excess material, although not zero on the functional surfaces 43, 46 in order to allow for the finishing work, is minimal.

FIG. 8 shows, by means of cross-hatching oriented differently on the two sheets, that it is possible to orientate the sheets with respect to each other such that there are more than two orientations of fibres in the plane of the disk.

The invention is not of course limited to the example which is shown and described.

The invention is applicable to multi-disk clutches actuated by jacks which it be hydraulic or electronic. With respect to the described examples, the clamping force can be produced by means other than with centrifugal flyweights. For example a spring producing a constant clamping force can be used.

The invention is also applicable to multi-disk brakes.

The invention is not of course limited to the example described and shown.

The invention is applicable to multi-disc clutches actuated by actuators which are themselves controlled by a logic circuit, whether this be hydraulic or electronic. In comparison with the described examples, the engaging force can be produced by means other than the centrifugal fly-weights. For example a spring producing a constant engaging force can be used. With regard to the method, it is possible to start with a sheet which is a little thicker than the discs if the friction faces are to be machined subsequently.

The invention is applicable to multi-disc brakes.

What is claimed is:

1. An automatic transmission comprising at least one combination of teeth and at least one multi-disc clutch which is automatically controlled between an engaged state and a disengaged and a disengaged state in order to cause the combination of teeth to operate in a first, and respectfully in a second transmission ratio, wherein said multi-disc clutch comprises a first and second coaxially rotatable members, a first group of discs made of metal, which are mounted for common rotation with the first member and alternating with discs of a second group, which are mounted for common rotation with the second member, and means for selectively axially compressing and respectfully axially releasing releasing the discs, wherein each disc of the second group comprises a single mass of carbon-based material defining two opposed friction faces, said opposed friction faces being exposed to contact with oil of an oil bath at least when the coupling device is disengaged, wherein the combination of teeth is at least partially off-loaded when the clutch is engaged, and wherein the transmission comprises means of transmitting to the clutch, in the sense of disengagement, a gearing reaction generated in the combination of teeth when said combination of teeth is under load, means for engaging the clutch under a calibrated force giving the clutch a corresponding torque transmission capability, and a means of the free wheel type to prevent the reverse rotation of a reaction number supporting one set of the teeth of said combination.

2. A transmission according to claim 1, wherein the carbon-based material of the discs of the second group is reinforced with fibres.

3. A transmission according to claim 2, wherein the fibres are carbon fibres.

4. A transmission according to claim 1, wherein the discs of the first group are made of hardened steel.

5. A transmission according to claim 1, wherein the thickness of the discs of the second group is greater than that of the discs of the first group.

6. A transmission according to claim 5, wherein the discs of the first group have a thickness of about 1 mm and the discs of the second group have a thickness of about 3 mm.

7. A transmission according to claim 1, wherein the first group of discs comprises one disc more than the second group, and wherein two end discs of a stack of discs formed by said first and second group of discs both belong to the first group.

8. A transmission according to claim 1, wherein the second member comprises axial grooves and discs of the second group comprise teeth slidingly engaged in the grooves, and wherein said teeth are also made of the carbon-based material of said single mass.

9. A transmission according to claim 8, wherein the teeth of discs of the second group are oriented radially inwardly.

10. A transmission according to claim 1, wherein said friction faces of the discs of the second group and friction faces of the discs of the first group are substantially smooth.

11. A transmission according to claim 2 or 3, wherein said reinforcing fibres extend in at least two orientations which are generally parallel to said friction faces, and wherein said reinforcing fibres as seen perpendicularly to said friction faces, form multiple crossing underlying at least a major part of said friction faces.

12. A transmission according to claim 11, wherein said reinforcing fibres comprise a woven layer of fibres.

13. A transmission according to claim 12, wherein said reinforcing fibres comprise at least two woven layers of fibres, stacked along an axial direction of the friction disk.

14. A transmission according to claim 12, wherein said orientations are different in said two layers.

15. A transmission according to claim 11, wherein said reinforcing fibres comprise at least two layers in each of which the reinforcing fibres have substantially a same one of said orientations, with the orientation of the fibres in one layer being different from the orientation of the fibres in the other layer.

16. A transmission according to claim 1, wherein said mass of carbon material has a porosity of between 10 and 30%.

17. A transmission according to claim 16, wherein said porosity is between 15 and 25%.

18. A transmission according to claim 1, wherein said mass of carbon material has interconnected pores, opening through said friction faces of the discs of the second group and through at least one other face thereof.

19. A transmission according to claim 2, wherein carbon fibres have a diameter between 5 and 10 $\mu$m.

20. A transmission according to claim 2, wherein the carbon fibres have a diameter between 7 and 8 $\mu$m.

21. A transmission according to claim 1, wherein said fibres are substantially rectilinear.

22. A transmission according to claim 1, wherein the carbon-based material of the discs of the second group is reinforced with fibres.

23. A transmission according to claim 22, wherein the fibres are carbon fibres.

24. A transmission according to claim 1, wherein the discs of the first group are made of hardened steel.

25. A transmission according to claim 1, wherein the thickness of the discs of the second group is greater than that of the discs of the first group.

26. A transmission according to claim 25, wherein the discs of the first group have a thickness of about 1 mm and the discs of the second group have a thickness of about 3 mm.

27. A transmission according to claim 1, wherein the first group of discs comprises one disc more than the second group, and wherein two end discs of a stack of discs formed by said first and second group of discs both belong to the first group.

28. A transmission according to claim 1, wherein the second member comprises axial groove and discs of the second group comprise teeth slidingly engaged in the grooves, and wherein said teeth are also made of the carbon-based material of said single mass.

29. A transmission according to claim 1, wherein said friction faces of the discs of the second group and friction faces of the discs of the first group are substantially smooth.

30. A transmission according to claim 29, wherein the teeth of discs of the second group are oriented radially inwardly.

31. A transmission according to claim 22 or 23, wherein said reinforcing fibres extend in at least two orientations which are generally parallel to said friction face, and wherein said reinforcing fibres as seen perpendicularly to said friction face, form multiple crossing underlying at least a major part of said friction face.

32. A transmission according to claim 31, wherein said reinforcing fibres comprise a woven layer of fibres.

33. A transmission according to claim 32, wherein said reinforcing fibres comprise at least two woven layers of fibres, stacked along an axial direction of the friction disk.

34. A transmission according to claim 32, wherein said orientations are different in said two layers.

35. A transmission according to claim 31, wherein said reinforcing fibres comprise at least two layers in each of which the reinforcing fibres have substantially a same one of said orientations, with the orientation of the fibres in one layer being different from the orientation of the fibres in the other layer.

36. A transmission according to claim 1, wherein said mass of carbon material has a porosity of between 10 and 30%.

37. A transmission according to claim 36, wherein said porosity is between 15 and 25%.

38. A transmission according to claim 1, wherein said mass of carbon material has interconnected pores, opening through said friction faces of the disk and through at least one other face of the disk.

39. A transmission according to claim 22, wherein the carbon fibres have a diameter between 5 and 10 $\mu$m.

40. A transmission according to claim 22, wherein the carbon fibres have a diameter between 7 and 8 $\mu$m.

41. A transmission according to claim 1, wherein said fibres are substantially rectilinear.

* * * * *

UNITED STATES PATENT AND TRADEMARK OFFICE
CERTIFICATE OF CORRECTION

PATENT NO. : 6,042,500
DATED : March 28, 2000
INVENTOR(S) : Roumen Antonov

It is certified that error appears in the above-identified patent and that said Letters Patent is hereby corrected as shown below:

Column 3, line 55, change "he" to --the--;

Column 8, line 65, change "in cut," to --is cut--;

Column 11, line 66, change "crossing" to --crossings--;

Column 12, line 61, change "crossing" to --crossings--;

Signed and Sealed this

Third Day of April, 2001

Attest:

NICHOLAS P. GODICI

Attesting Officer

Acting Director of the United States Patent and Trademark Office